(12) United States Patent
Hsiao

(10) Patent No.: US 11,284,672 B2
(45) Date of Patent: Mar. 29, 2022

(54) METHOD OF FORMING AND SHAPING WATERPROOF AND MOISTURE PERMEABLE SHOE UPPER AND SHOE UPPER THEREOF

(71) Applicant: Sheng Long Material Tech. Ltd. (WS), Apia (WS)

(72) Inventor: Chin-Hsun Hsiao, Taipei (TW)

(73) Assignee: SHENG LONG MATERIAL TECH. LTD. (WS), Apia (WS)

( * ) Notice: Subject to any disclaimer, the term of this patent is extended or adjusted under 35 U.S.C. 154(b) by 231 days.

(21) Appl. No.: 16/553,581

(22) Filed: Aug. 28, 2019

(65) Prior Publication Data

US 2020/0068992 A1    Mar. 5, 2020

(30) Foreign Application Priority Data

Aug. 31, 2018   (TW) ................................ 107130727

(51) Int. Cl.
*A43B 23/02*        (2006.01)
*A43D 11/00*        (2006.01)

(52) U.S. Cl.
CPC .......... *A43B 23/022* (2013.01); *A43D 11/003* (2013.01)

(58) Field of Classification Search
None
See application file for complete search history.

(56) References Cited

U.S. PATENT DOCUMENTS

| 5,289,644 | A  | * | 3/1994 | Driskill | A43B 7/125 36/12 |
|---|---|---|---|---|---|
| 9,968,157 | B2 | * | 5/2018 | Wardlaw | A43B 13/125 |
| 2003/0145495 | A1 | * | 8/2003 | Green | A43B 17/00 36/145 |
| 2005/0230026 | A1 | | 10/2005 | Kramer | |
| 2010/0115792 | A1 | * | 5/2010 | Muller | A43B 7/125 36/83 |
| 2011/0179677 | A1 | * | 7/2011 | Jessiman | A43B 7/125 36/3 A |
| 2013/0291409 | A1 | | 11/2013 | Reinhardt et al. | |
| 2014/0033452 | A1 | | 2/2014 | Mueller | |
| 2014/0366403 | A1 | | 12/2014 | Reinhardt et al. | |
| 2014/0366404 | A1 | | 12/2014 | Reinhardt et al. | |
| 2014/0366405 | A1 | | 12/2014 | Reinhardt et al. | |

(Continued)

FOREIGN PATENT DOCUMENTS

| CN | 2542097 | 4/2003 |
|---|---|---|
| CN | 1988817 A | 6/2007 |

(Continued)

*Primary Examiner* — Jila M Mohandesi
(74) *Attorney, Agent, or Firm* — Innovation Capital Law Group, LLP; Vic Lin

(57) ABSTRACT

A method of forming and shaping a waterproof and moisture permeable shoe upper includes disposing a shoe upper and a waterproof and moisture permeable film on a shoe last, wherein at least one of the shoe upper and the waterproof and moisture permeable film includes microwave treatable material, and heating the shoe last with the shoe upper and the waterproof and moisture permeable film thereon by microwave, so that the shoe upper and the waterproof and moisture permeable film are combined by the microwave treatable material and shaped to form the waterproof and moisture permeable shoe upper after cooling.

11 Claims, 16 Drawing Sheets

(56) References Cited

U.S. PATENT DOCUMENTS

| | | | |
|---|---|---|---|
| 2015/0230541 A1* | 8/2015 | Bacino | A43B 23/026 36/44 |
| 2016/0128426 A1 | 5/2016 | Reinhardt et al. | |
| 2017/0306539 A1* | 10/2017 | Gladish | A43B 23/0225 |
| 2018/0035755 A1 | 2/2018 | Reinhardt et al. | |
| 2018/0125159 A1* | 5/2018 | Adami | A43B 1/0018 |

FOREIGN PATENT DOCUMENTS

| | | |
|---|---|---|
| CN | 101677646 A | 3/2010 |
| CN | 106235518 A | 12/2016 |
| CN | 104227904 B | 12/2017 |
| CN | 103371564 B | 6/2018 |
| EP | 3181620 A1 | 6/2017 |
| TW | 201736093 A | 10/2017 |
| TW | 201736423 A | 10/2017 |
| TW | 201736450 A | 10/2017 |
| TW | I607125 B | 12/2017 |

\* cited by examiner

METHOD OF FORMING AND SHAPING WATERPROOF AND MOISTURE PERMEABLE SHOE UPPER AND SHOE UPPER THEREOF

BACKGROUND OF THE INVENTION

1. Field of the Invention

The invention generally relates to a method of forming a shoe upper and a shoe upper thereof. Particularly, the invention relates to a method of forming and shaping a waterproof and moisture permeable shoe upper and a shoe upper thereof by microwave treatment.

2. Description of the Prior Art

Owing to better permeability and comfort, knitted shoes have become one of the focusing developments in the footwear industry. However, due to the knitting characteristics of the knitted upper, water easily penetrates or permeates through the knitted upper when the knitted shoes are used in wet or rainy environment, causing the wearer uncomfortable wearing experience. Conventionally, in order to enhance the water-resistant ability of the knitted upper, water resistant materials or films are coated or attached to the knitted upper after the knitted upper is knitted and shaped. However, the process of coating or attaching the water-resistant materials or films not only complicates the manufacturing process, but also limits the selection of the water-resistant materials, and the adhesion of the water-resistant film after the knitted upper is shaped is not as strong as the coating of water-resistant materials.

Therefore, how to improve the water-resistant ability is one of the important issues in developing the knitted shoes.

SUMMARY OF THE INVENTION

It is an object of the invention to provide a method of forming and shaping a waterproof and moisture permeable shoe upper, which utilizes microwave treatment to achieve the connection and shaping of the shoe upper and the waterproof and moisture permeable film, facilitating the simplification of manufacturing process.

In an embodiment, a method of forming and shaping a waterproof and moisture permeable shoe upper includes: disposing a shoe upper and a waterproof and moisture permeable film on a shoe last, at least one of the shoe upper and the waterproof and moisture permeable film including microwave treatable material, and heating the shoe last with the shoe upper and the waterproof and moisture permeable film thereon by microwave, so that the shoe upper and the waterproof and moisture permeable film are combined by the microwave treatable material and shaped to form the waterproof and moisture permeable shoe upper after cooling.

In an embodiment, the waterproof and moisture permeable film is disposed between the shoe last and the shoe upper.

In an embodiment, the shoe upper is a dual-layered knitted structure comprising an inner layer and an outer layer, and the waterproof and moisture permeable film is disposed between the inner layer and the outer layer.

In an embodiment, before the heating step, the method further includes: disposing a plurality of first semi-foamed granules including microwave treatable material into a mold, and disposing the shoe last with the shoe upper and the waterproof and moisture permeable film thereon on the mold in a manner that the shoe upper at least partially contacts the first semi-foamed granules, wherein during the heating step, the first semi-foamed granules are foamed to form an outsole bonded to the waterproof and moisture permeable shoe upper.

In an embodiment, the shoe upper is a dual-layered knitted structure including an inner layer and an outer layer, and the method further includes: disposing a plurality of second semi-foamed granules including microwave treatable material between the inner layer and the outer layer, wherein during the heating step, the second semi-foamed granules are foamed to form an insole bonded to the waterproof and moisture permeable shoe upper.

In an embodiment, the method further includes: disposing an auxiliary element in the mold, wherein during the heating step, the plurality of first semi-foamed granules are foamed and pressed against each other to hold the auxiliary element, so that the auxiliary element is embedded in the outsole.

In an embodiment, the plurality of first semi-foamed granules includes a plurality of first granules within a first range of grain size and a plurality of second granules within a second range of grain size; a median of the first range of grain size is substantially larger than a median of the second range of grain size, and the step of disposing the plurality of first semi-foamed granules includes disposing the plurality of first granules and the plurality of second granules in different regions of the mold.

In an embodiment, the step of disposing the plurality of first semi-foamed granules further includes: disposing one or more film-like members in the mold to contact the plurality of first semi-foamed granules.

In an embodiment, at least one of the film-like members has a pattern, and the outsole has an indication pattern corresponding to the pattern.

In an embodiment, the microwave treatable materials of the at least one of the shoe upper and the waterproof and moisture permeable film, the first semi-foamed granules, and the second semi-foamed granules are same or different material, and independently selected from the group consisting of polyurethane, thermoplastic polyurethane, thermoplastic elastomer, and a combination thereof.

In another embodiment, the invention provides a waterproof and moisture permeable shoe upper made by the method described above, wherein the waterproof and moisture permeable film has a waterproof ability of 1000 mm to 2000 mm or more and a moisture permeability of 2000 to 3000 $g/m^2/24$ h or more.

In an embodiment, the invention provides a waterproof and moisture permeable shoe upper, which includes: a shoe upper enclosing a cavity for a foot inserting therein, the shoe upper being a dual-layered knitted structure including an inner layer and an outer layer, and a waterproof and moisture permeable film bonded to the shoe upper and disposed between the inner layer and the outer layer, wherein at least one of the shoe upper and the waterproof and moisture permeable film includes microwave treatable material, and the shoe upper and the waterproof and moisture permeable film are combined by the microwave treatable material.

In an embodiment, the waterproof and moisture permeable shoe upper further includes an outsole, wherein the outsole is bonded to a bottom of the shoe upper, and the outsole is formed by foaming a plurality of first semi-foamed granules including microwave treatable material.

In an embodiment, the waterproof and moisture permeable shoe upper further includes an insole, wherein the insole is disposed between the inner layer and the outer layer, and the insole is formed by foaming a plurality of second semi-foamed granules including microwave treatable material.

In an embodiment, the waterproof and moisture permeable shoe upper further includes an auxiliary element embedded in at least one of the outsole and the insole.

Compared to the prior art, the waterproof and moisture permeable shoe upper of the invention includes microwave treatable material, so that the process of attaching the waterproof and moisture permeable film and the process of shaping the shoe upper can be integrated by microwave treatment, simplifying the manufacturing process and improving the production yield.

DETAILED DESCRIPTION OF THE PREFERRED EMBODIMENT

Various embodiments will be described hereinafter, and one skilled in the art having ordinary knowledge in the description with reference to the drawings, it should be readily understood that the spirit and principle of the present invention. However, although some specific embodiments will be specified, these embodiments are to be considered as illustrative and not restrictive or limiting. Therefore, for those who have general knowledge in the technical field of their own, without departing from the spirit and principles of the present invention, the various changes and modifications to the present invention should be obvious and easily achievable.

Figure 1A:
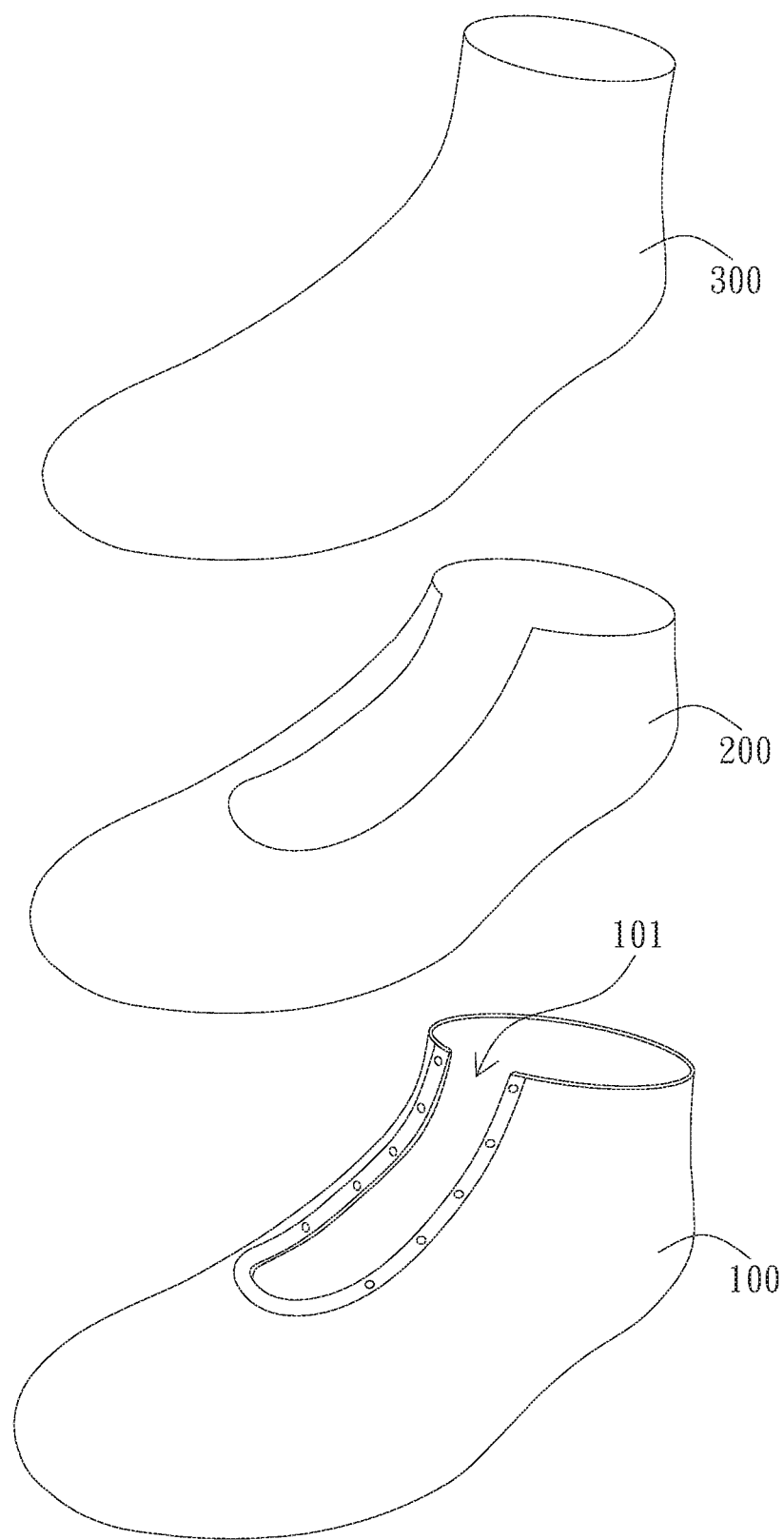
FIGS. 1A and 1B are schematic views of an embodiment of the method of forming and shaping a waterproof and moisture permeable shoe upper of the invention.
Figure 1B:
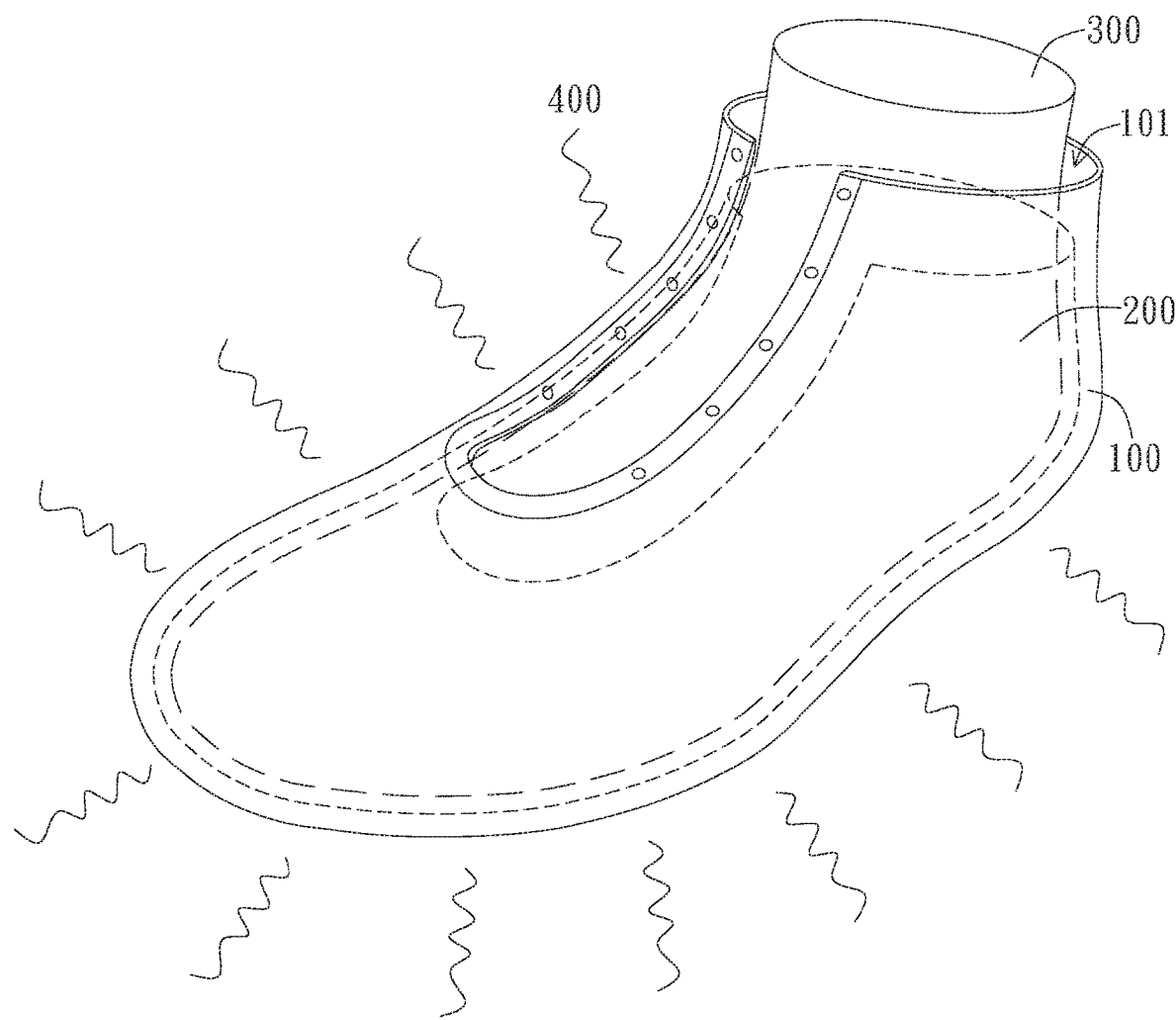
Figure 1C:
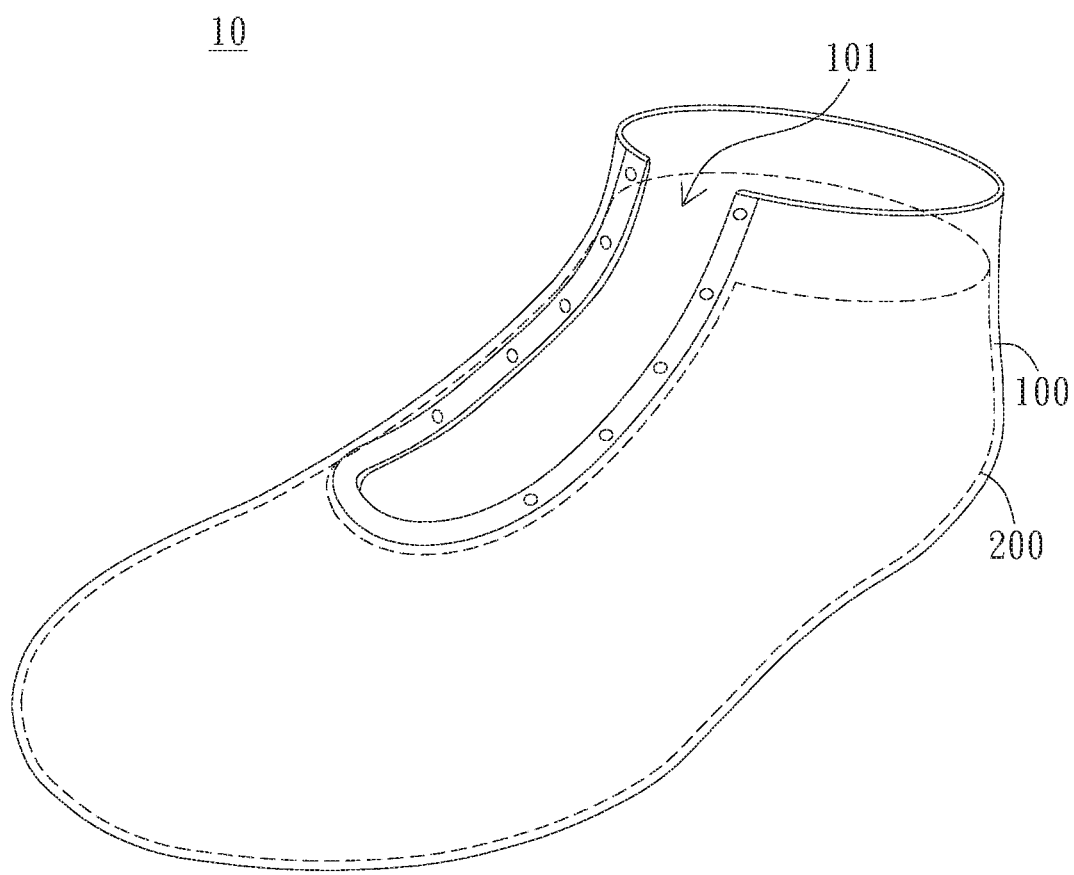
FIG. 1C is a schematic view of an embodiment of the waterproof and moisture permeable shoe upper of the invention.

As shown in FIGS. 1A to 1C, in an embodiment, a method of forming and shaping a waterproof and moisture permeable shoe upper includes: disposing a shoe upper 100 and a waterproof and moisture permeable film 200 on a shoe last 300, and heating the shoe last 300 with the shoe upper 100 and the waterproof and moisture permeable film 200 thereon by microwave. At least one of the shoe upper 100 and the waterproof and moisture permeable film 200 includes microwave treatable material. The shoe last 300 with the shoe upper 100 and the waterproof and moisture permeable film 200 is heated by microwave 400, so that the shoe upper 100 and the waterproof and moisture permeable film 200 are combined by the microwave treatable material and shaped to form the waterproof and moisture permeable shoe upper 10 after cooling.

Specifically, in an embodiment, the shoe upper 100 is preferably a knitted upper and encloses a cavity 101 for a foot inserting therein. For example, the shoe upper 100 is preferably a three-dimensional upper with the cavity 101 formed by a cylinder knitting machine or a flat knitting machine. That is, after the knitting process is completed, the shoe upper 100 having an integral three-dimensional structure is preferably formed without further processing steps, such as sewing, adhering, but not limited thereto. In another embodiment, the shoe upper 100 can be a two-dimensional upper formed by knitting yarn(s), and then processed to form a three-dimensional upper with the cavity 101. Moreover, the shoe upper 100 is preferably a knitted upper having a sole portion, but not limited thereto. In another embodiment, the shoe upper 100 can be a knitted upper with opening on its bottom, i.e. the sole portion of the shoe upper 100 is formed with an opening. It is noted that the number, color, or material of yarns for forming the shoe upper 100 can be modified according to the requirements of stretchability, color, or pattern design.

In an embodiment, the shoe upper 100 preferably includes microwave treatable material. For example, when the shoe upper 100 is knitted, a yarn formed by the microwave treatable material can be used with a regular yarn for knitting the shoe upper 100, so that the knitted shoe upper 100 at least partially includes the microwave treatable material. The microwave treatable material refers to a material that can adhere the shoe upper 100 and the waterproof and moisture permeable film 200 when the temperature is raised under the microwave 400 without substantially influencing the waterproof ability and the moisture permeability of the waterproof and moisture permeable film 200. For example, the microwave treatable material includes, but not limited to, polyurethane (PU), thermoplastic polyurethane (TPU), thermoplastic elastomer (TPE), or a combination thereof. In an embodiment, the shoe upper 100 is preferably knitted from the thermoplastic polyurethane and a regular yarn.

The waterproof and moisture permeable film 200 preferably has a waterproof ability (WP) of 1000 mm to 2000 mm or more and a moisture permeability (MP) of 2000 to 3000 $g/m^2/24$ hr or more, so as to assist in discharging the sweat of human body in the form of water vapor, and to assist in isolating the infiltration of external water liquid. The "waterproof ability" refers to the test for resistance against water pressure; for example, how many millimeters of water pressure per square centimeter of area can be sustained without leaking, such as 1000 mm to 2000 mm or more. The "moisture permeability" refers to the test for water vapor permeability; for example, the amount of water vapor permeates per square meter of area for 24 hours, such as 2000 to 3000 $g/m^2/24$ hr. It is noted that the waterproof and moisture permeable film 200 can be designed according to requirements and expectations to have varying degrees of waterproof ability and moisture permeability.

In an embodiment, the waterproof and moisture permeable film 200 preferably includes microwave treatable material, such as PU, TPU, or TPE, mentioned above, but limited thereto. In an embodiment, when the waterproof and moisture permeable film 200 and the shoe upper 100 both include microwave treatable material, the microwave treatable materials of the waterproof and moisture permeable film 200 and the shoe upper 100 are preferably the same to facilitate the control of the operation parameters of microwave treatment, such as treating time, treating power, but not limited thereto. In another embodiment, the microwave treatable materials of the waterproof and moisture permeable film 200 and the shoe upper 100 can be different. In this embodiment, the waterproof and moisture permeable film 200 and the shoe upper 100 preferably both include the microwave treatable material, but not limited thereto. According to practical applications, only one of the waterproof and moisture permeable film 200 and the shoe upper 100 having the microwave treatable material can also achieve the adhesion of the waterproof and moisture permeable film 200 and the shoe upper 100 by at least partially melting the microwave treatable material to bond the waterproof and moisture permeable film 200 and the shoe upper 100 and to form the waterproof and moisture permeable shoe upper 10. Moreover, in an embodiment, the waterproof and moisture permeable film 200 preferably substantially completely covers the shoe upper 100 to provide the entire shoe upper 10 with the waterproof ability and the moisture permeability, but not limited thereto. In another embodiment, according to practical applications, the waterproof and moisture permeable film 200 can partially cover the shoe upper 100, so the shoe upper 10 has the waterproof ability and the moisture permeability at desired portions.

As shown in FIG. 1B, in this embodiment, the waterproof and moisture permeable film 200 is preferably disposed between the shoe last 300 and the shoe upper 100. For example, the waterproof and moisture permeable film 200 is firstly disposed in the inner side of the shoe upper 100, such as in the cavity 101, and the shoe upper 100 with the waterproof and moisture permeable film 200 is then set on the shoe last 300, but not limited thereto. In another embodiment, the waterproof and moisture permeable film 200 can be firstly set on the shoe last 300, and the shoe upper 100 is then worn on the shoe last 100 to have the waterproof and moisture permeable film 200 sandwiched between the shoe last 100 and the shoe upper 100. After the shoe upper 100 and the waterproof and moisture permeable film 200 are disposed on the shoe last 100, the heating step is performed by microwave 400. Specifically, the power of microwave and the treating time can be modified based on the microwave treatable material, so that the microwave treatable material can adhere the shoe upper 100 and the waterproof and moisture permeable film 200 when the temperature is raised under the microwave 400 without substantially influencing the waterproof ability and the moisture permeability of the waterproof and moisture permeable film 200. As such, the adhesion of the shoe upper 100 and the waterproof and moisture permeable film 200 is achieved. As shown in FIG. 1C, after the microwave treatment, the waterproof and moisture permeable shoe upper 10 is shaped by cooling the microwave treatable material and then removed from the shoe last 300. Specifically, in this embodiment, the waterproof and moisture permeable shoe upper 10 includes the shoe upper 100 and the waterproof and moisture permeable film 200, wherein the shoe upper 100 encloses the cavity 101 for the foot inserting therein. The waterproof and moisture permeable film 200 is bonded to the inner surface of the shoe upper 100 and disposed in the cavity 101. At least one of the shoe upper 100 and the waterproof and moisture permeable film 200 includes the microwave treatable material, so that the shoe upper 100 and the waterproof and moisture permeable film 200 are combined by the microwave treatable material. In other words, the process of attaching the waterproof and moisture permeable film to the shoe upper and the process of shaping the shoe upper are integrated by the microwave treatment, so as to simplify the manufacturing process and promote the production yield.

Figure 2A:
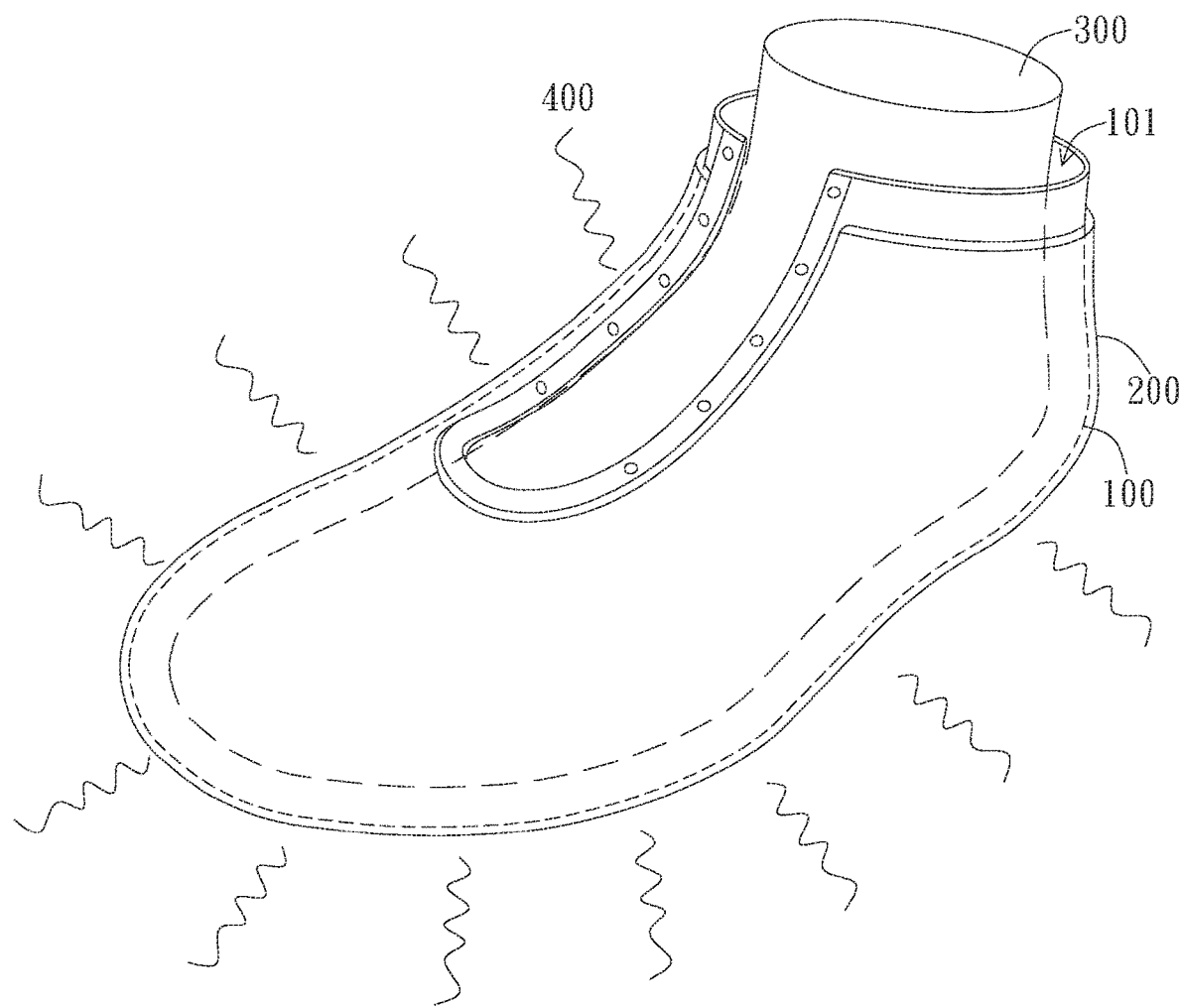
FIGS. 2A and 2B are schematic views of another embodiment of the method of forming and shaping a waterproof and moisture permeable shoe upper and the shoe upper formed by the method of the invention.
Figure 2B:
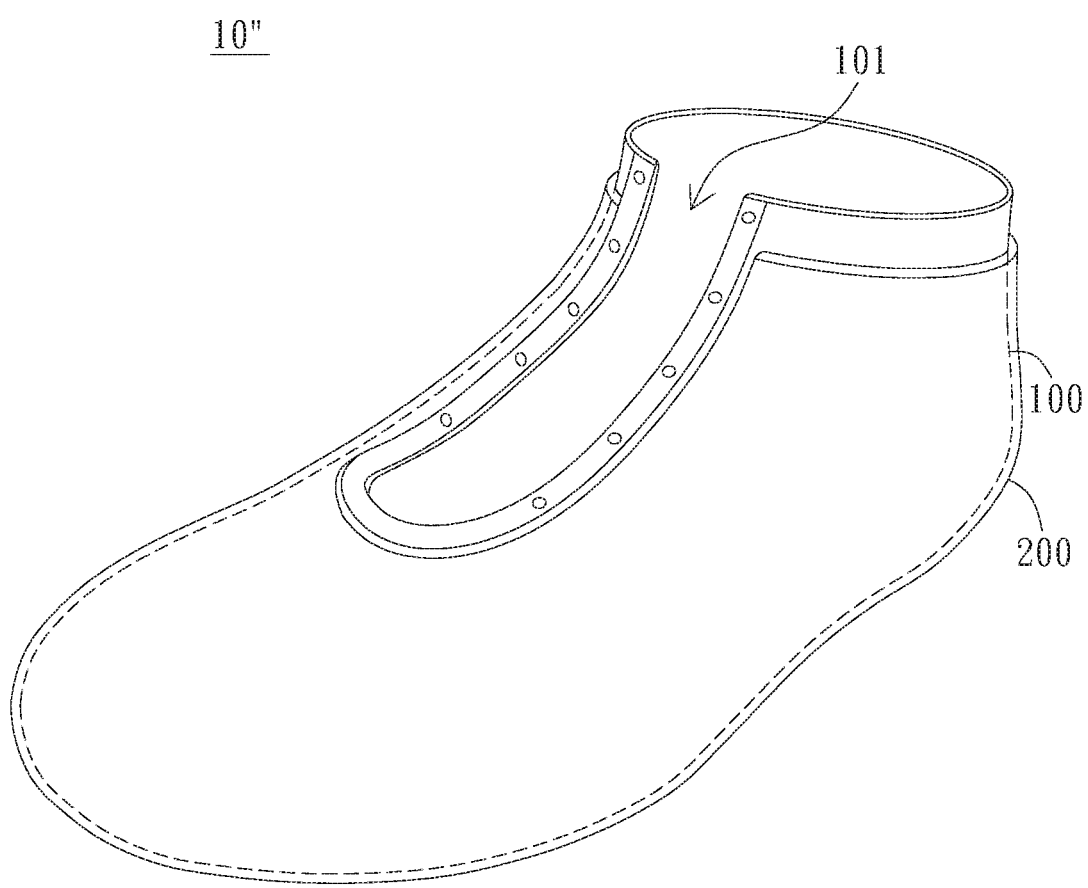

In the above embodiment, the waterproof and moisture permeable film 200 is illustrated to be disposed between the shoe last 300 and the shoe upper 100, but not limited thereto. In another embodiment, as shown in FIGS. 2A and 2B, the shoe upper 100 can be disposed between the shoe last 300 and the waterproof and moisture permeable film 200. For example, the shoe upper 100 can be firstly disposed on the shoe last 300, and then the waterproof and moisture permeable film 200 is disposed on the shoe upper 100. Specifically, when the waterproof and moisture permeable film 200 substantially completely covers the shoe upper 100 to have a three-dimensional structure, the waterproof and moisture permeable film 200 can be worn on the shoe upper 100 without additional holding means. When the waterproof and moisture permeable film 200 partially covers the shoe upper 100, the waterproof and moisture permeable film 200 can be pre-attached to the shoe upper 100 by adhesives. After the shoe upper 100 and the waterproof and moisture permeable film 200 are disposed on the shoe last 300, the power of microwave and the treating time can be controlled based on the microwave treatable material, so that the microwave treatable material can adhere the shoe upper 100 and the waterproof and moisture permeable film 200 when the temperature is raised under the microwave 400 without substantially influencing the waterproof ability and the moisture permeability of the waterproof and moisture permeable film 200. As such, the adhesion of the shoe upper 100 and the waterproof and moisture permeable film 200 is achieved. As shown in FIG. 2A, when the cooling step is performed after the microwave treatment, the waterproof and moisture permeable shoe upper 10" is shaped and removed from the shoe last 300. Specifically, in this embodiment, the waterproof and moisture permeable shoe upper 10" includes the shoe upper 100 and the waterproof and moisture permeable film 200, wherein the shoe upper 100 encloses the cavity 101 for the foot inserting therein. The waterproof and moisture permeable film 200 is bonded to the outer surface of the shoe upper 100. At least one of the shoe upper 100 and the waterproof and moisture permeable film 200 includes the microwave treatable material, so that the shoe upper 100 and the waterproof and moisture permeable film 200 are combined by the microwave treatable material.

Figure 3A:
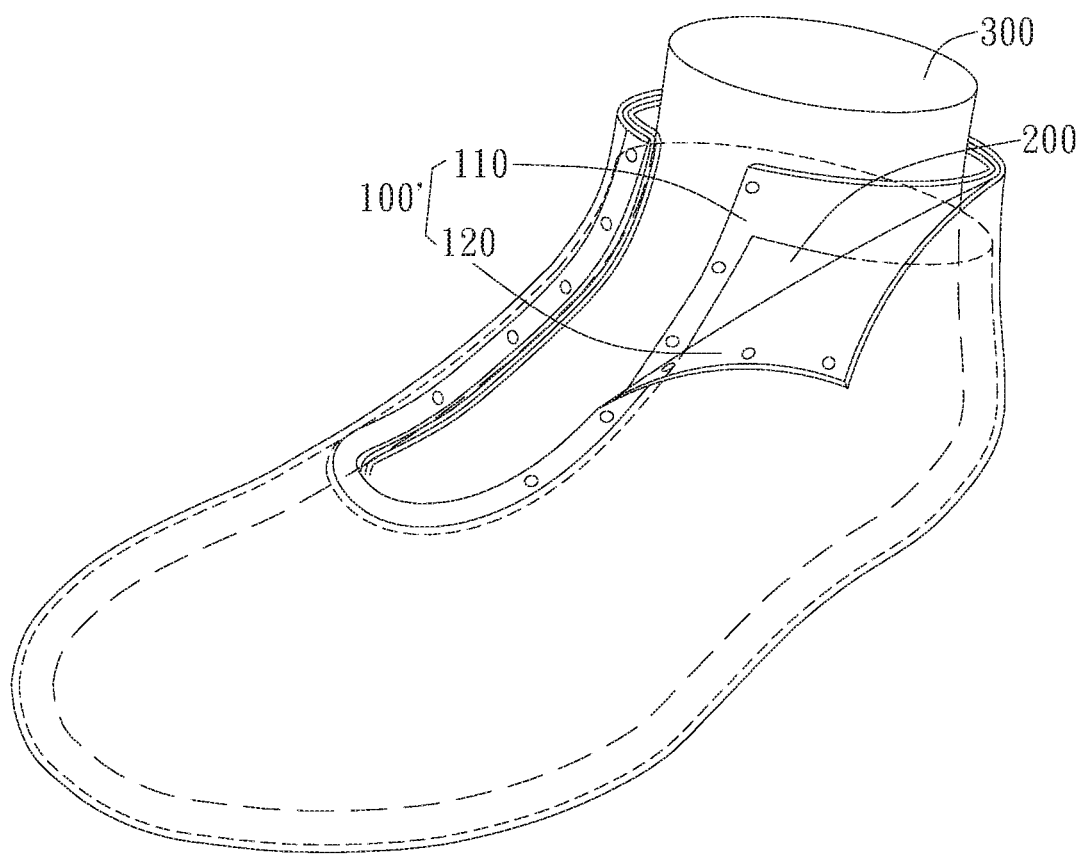
FIGS. 3A and 3B are schematic views of another embodiment of the method of forming and shaping a waterproof and moisture permeable shoe upper and the shoe upper formed by the method of the invention.
Figure 3B:
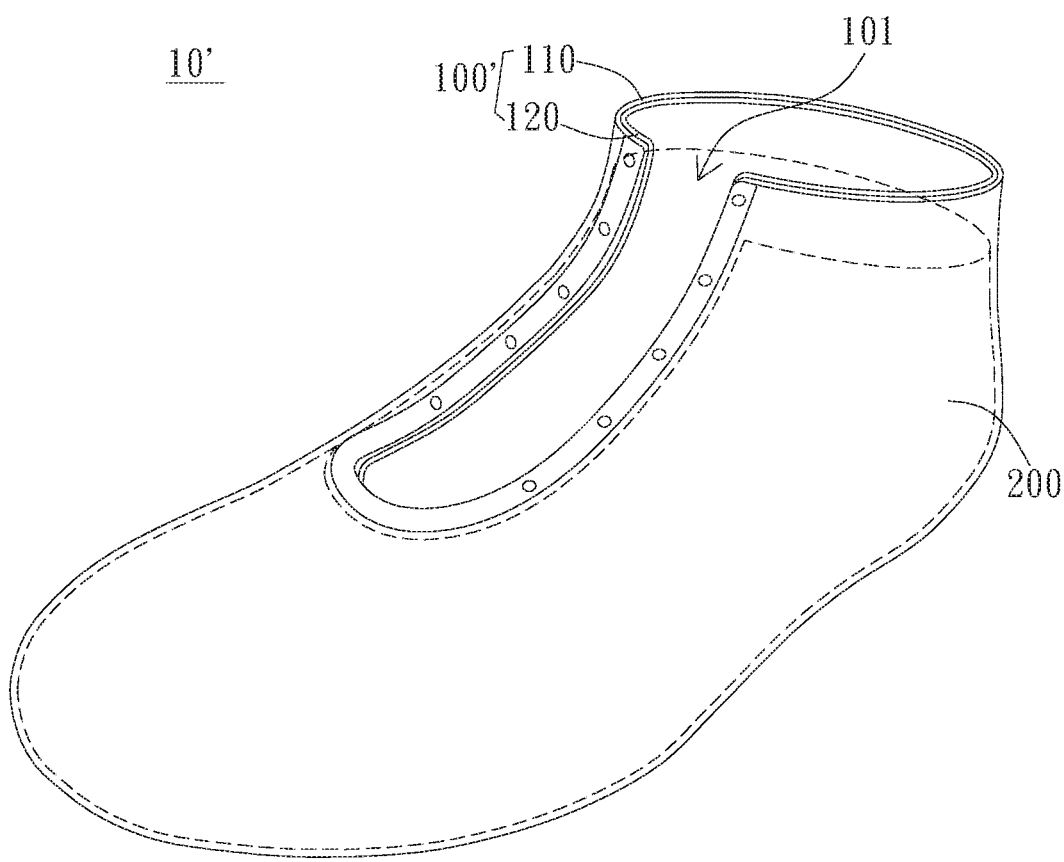

Moreover, the shoe upper can have a single-layered structure or a dual-layered structure. As shown in FIGS. 3A and 3B, in an embodiment, the shoe upper 100' is preferably a dual-layered structure including an inner layer 120 and an outer layer 110. For example, the inner layer 120 and the outer layer 110 of the shoe upper 100' can be an integrally formed dual-layered structure by knitting or can be independently formed and then combined together by sewing. In this embodiment, the waterproof and moisture permeable film 200 is preferably disposed between the inner layer 120 and the outer layer 110. For example, before the shoe upper 100' is set on the shoe last 300, the waterproof and moisture permeable film 200 is sandwiched between the inner layer 120 and the outer layer 110, so as to position the waterproof and moisture permeable film 200. In this embodiment, it is preferable that the inner layer 120 and the outer layer 110 both include the microwave treatable material. Therefore, in the heating step, the microwave treatable material not only adhere the shoe upper 100' and the waterproof and moisture permeable film 200, but also adhere the inner layer 120 and the outer layer 110 directly or with the waterproof and moisture permeable film 200 interposed therebetween. As such, the waterproof and moisture permeable shoe upper 10' is formed as a three-layered structure including, sequentially from the inside to the outside, the inner layer 120, the waterproof and moisture permeable film 200, and the outer layer 110. In other words, as shown in FIG. 3B, in this embodiment, the waterproof and moisture permeable shoe upper 10' includes the shoe upper 100' and the waterproof and moisture permeable film 200. The shoe upper 100' encloses the cavity 101 for the foot inserting therein, and the shoe upper 100' is a dual-layered structure including the inner layer 120 and the outer layer 110. The waterproof and moisture permeable film 200 is bonded to the shoe upper 100' and disposed between the inner layer 120 and the outer layer 110. At least one of the shoe upper 100' and the waterproof and moisture permeable film 200 includes the microwave treatable material, and the shoe upper 100' and the waterproof and moisture permeable film 200 are combined by the microwave treatable material.

Figure 4A:
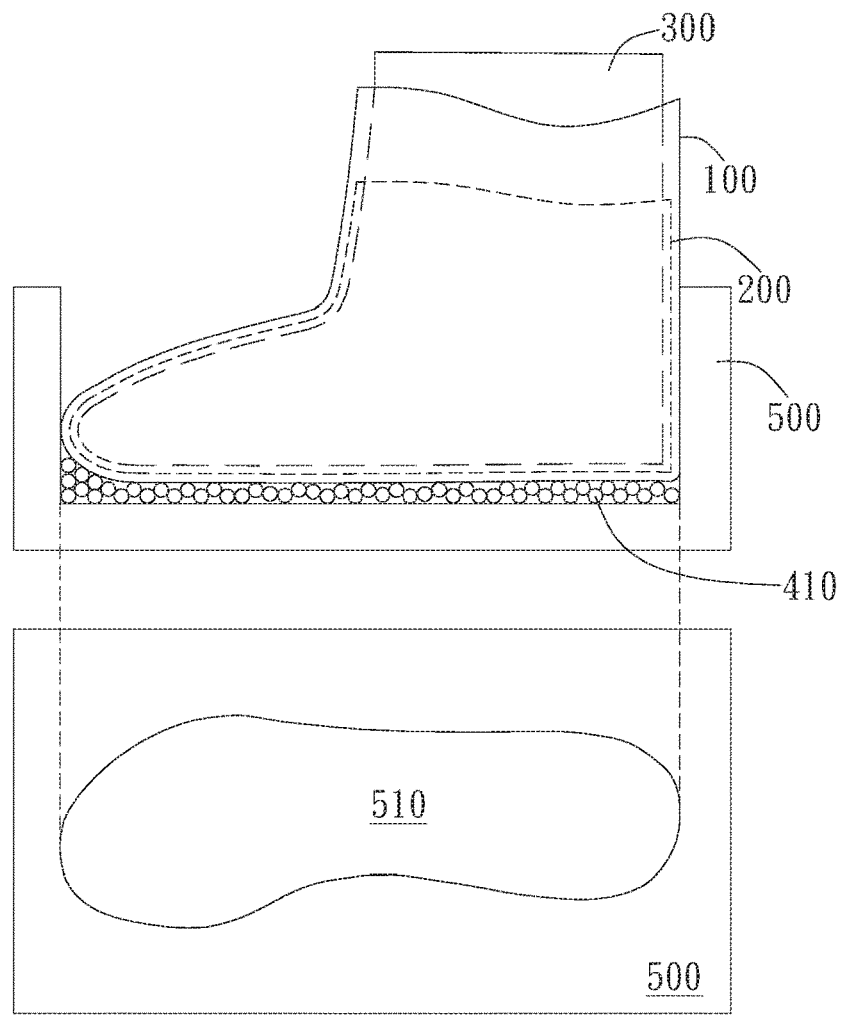
FIGS. 4A and 4B are schematic views of an embodiment of the method of integrating the outsole to the waterproof and moisture permeable shoe upper and the shoe upper formed by the method of the invention.
Figure 4B:
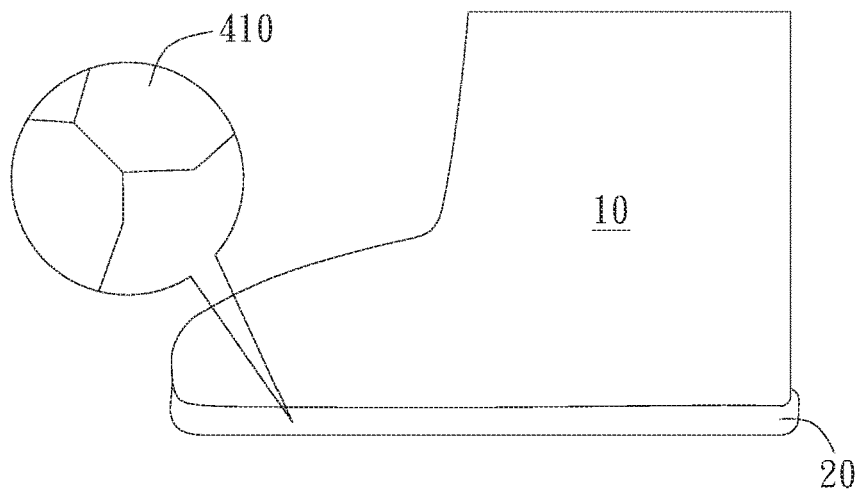

As shown in FIGS. 4A and 4B, in another embodiment, before the heating step, the method further includes: disposing a plurality of first semi-foamed granules 410 including microwave treatable material into a mold 500, and disposing the shoe last 300 with the shoe upper 100 (or 100') and the waterproof and moisture permeable film 200 thereon on the mold 500 in a manner that the shoe upper at least partially contacts the first semi-foamed granules 410. As such, during the heating step, the first semi-foamed granules 410 are foamed to form an outsole 20 bonded to the waterproof and moisture permeable shoe upper 10 (or 10').

Specifically, the cavity 510 of the mold 500 has the shape of a sole, and the mold 500 is not affected by microwave. Preferably, the mold 500 is heat-resistant and can withstand the temperature rise caused by microwave heating. For example, an ultra-transparent, low-loss material allows microwaves to easily pass through and not be absorbed, or a completely opaque material such as a metal conductor reflects all incoming microwaves and does not allow microwaves to penetrate. Such a material that cannot be heated by microwaves if not raising the temperature by other surrounding materials to denature or variable (e.g., foam), the materials are not affected by microwave and suitable for the mold 500.

In this embodiment, the first semi-foamed granules 410 can be foamed by microwave heating directly or by the temperature rising in the result of heating the other adjacent material. For example, the first semi-foamed granules 410 can be high loss materials that can be heated by microwave heating. Alternatively, in the case where the first semi-foamed granules 410 are materials which are difficult to be heated by microwaves, an additive which easily absorbs microwaves (for example, $Al_2O_3$—SiC, etc.) may be further added to make the first semi-foamed granules 410 can be foamed by the temperature increase caused by the absorption of microwaves by the surrounding additives.

In an embodiment, the microwave treatable material of the first semi-foamed granules 410 includes, but not limited to, PU, TPU, TPE, ora combination thereof. The first semi-foamed granules 410 can be granules having a foaming ability and formed a certain grain size after foaming to some extent. Specifically, the first semi-foamed granules 410 can be made from the materials of PU, TPU, or TPE, which added a foaming agent and mixed after molded and through the incomplete foaming, and still retain foaming ability. For example, the first semi-foamed granules 410 can be formed by foaming thermoplastic polyurethane through semi-foaming (i.e., semi-foamed thermoplastic polyurethane), but not limited thereto. The first semi-foamed granules 410 can be prepared by any means with a certain extent of foaming to form a granule form, and still retain the foaming ability.

Before the heating step, the shoe last 300 with the shoe upper 100 and the waterproof and moisture permeable film 200 thereon is disposed on the mold 500 in a manner that the shoe upper 100 at least partially contacts the first semi-foamed granules 410. In an embodiment, the first semi-foamed granules 410 in the mold 500 are preferably distributed along the bottom of the shoe upper 100 (or the shoe last 300). As such, in the microwave heating step, the first semi-foamed granules 410 are foamed with the surfaces thereof welded to each other and bonded to the waterproof and moisture permeable shoe upper 10 (or 10') along the bottom of the shoe upper 100 (or the shoe last 300). That is, in the microwave heating step, the first semi-foamed granules 410 can form an outsole 20, which is integrally bonded to the waterproof and moisture permeable shoe upper 10 (or 10'), eliminating the additional bonding step of the outsole after the waterproof and moisture permeable shoe upper 10 (or 10') is formed and shaped. Therefore, the waterproof and moisture permeable shoe upper 10, 10'', or 10' in FIG. 1C, 2B, or 3B may further include the outsole 20, wherein the outsole 20 is bonded to the bottom of the shoe upper 10, 10'', or 10', and the outsole 20 is formed by foaming the first semi-foamed granules 410, which include microwave treatable material.

Figure 5A:
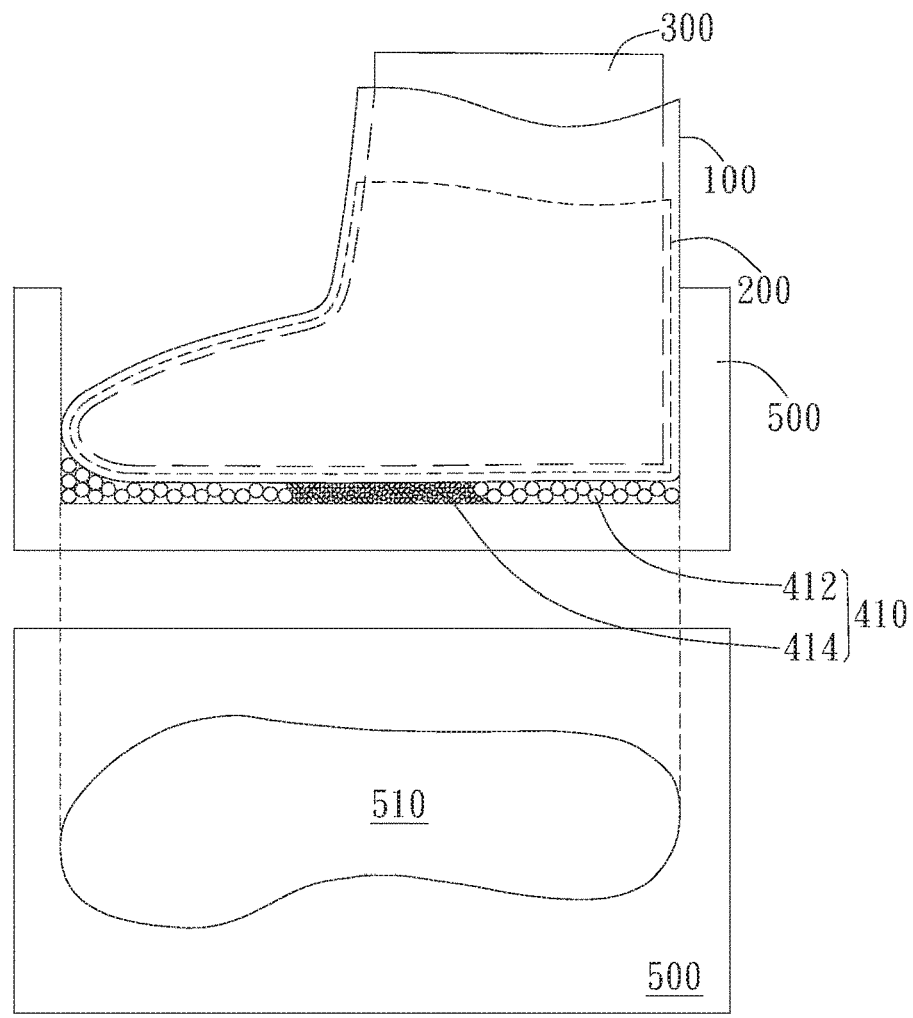
FIGS. 5A and 5B are schematic views of another embodiment of the method of integrating the outsole to the waterproof and moisture permeable shoe upper and the shoe upper formed by the method of the invention.
Figure 5B:
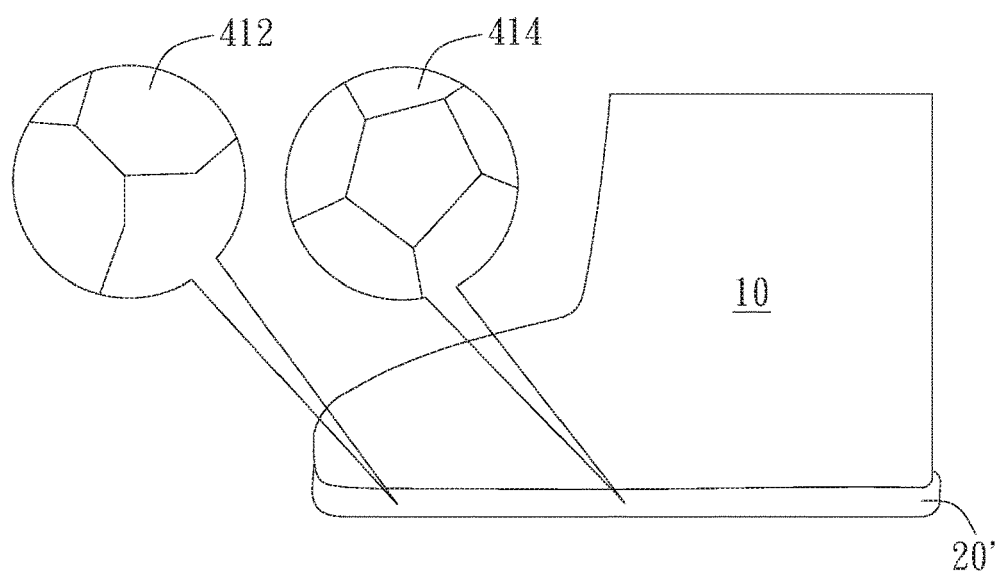

As shown in FIGS. 5A and 5B, in another embodiment, the plurality of first semi-foamed granules 410 include a plurality of first granules 412 within a first range of grain size and a plurality of second granules 414 within a second range of grain size. A median of the first range of grain size is substantially larger than a median of the second range of grain size. The step of disposing the plurality of first semi-foamed granules 410 includes: disposing the plurality of first granules 412 and the plurality of second granules 414 in different regions of the mold 500. Since the shape of the granules used in accordance with various embodiments may not be a true sphere but a near sphere, the grain size is defined as the largest major axis length of the granules. For example, in a preferred embodiment, the median of the first range of grain size is substantially equal to the average grain size of the first granules 412, and the median of the second range of grain size is substantially equal to the average grain size of the second granules 414. However, due to factors such as process tolerances, there may be a difference in grain size between the plurality of first granules 412 or between the plurality of second granules 414, and the average grain size thereof is not necessarily equal to the median.

Specifically, according to the cushion or support requirement in different regions of the outsole, the first granules 412 and the second granules 414 of different size ranges can be disposed in corresponding regions, respectively, so that the outsole 20 formed after the heating step will have desired cushion effect and supportability. For example, the outsole region formed by the second granules 414 of smaller size will have a higher density than the outsole region formed by the first granules 412 of larger size, so the outsole region formed by the second granules 414 has a relatively higher hardness, stronger supportability, and the outsole region formed by the first granules 412 is more resilient and has a better cushion effect. For example, the softer portion (or region) of the outsole preferably corresponds to a part of the outsole expected to contact the foot palm of the wearer so as to increase wearing comfort, while the harder portion of the outsole corresponds to the part which wearer's foot is not expected to contact to increase support, but not limited thereto.

Moreover, in order to distribute the first granules 412 and the second granules 414 to different regions according to design or requirements, in an embodiment, one or more partitions can be further placed into the mold 500 (i.e., into the cavity 510 of the mold 110) to divide the mold 500 into different regions. In another embodiment, film-like elements can wrap or cover the first granules 412 and the second granules 414, respectively, to position the first granules 412 and the second granules 414 in predetermined regions. The partition or film-like element is preferably made from microwave treatable materials, so that during the heating step, the partition or film-like element can be heated and integrally bonded to the first granules 412 and the second granules 414 by microwave heating. Therefore, as shown in FIG. 5B, the waterproof and moisture permeable shoe upper 10 further includes an outsole 20', wherein the outsole 20' is bonded to the bottom of the shoe upper 10, and the outsole 20' is formed by foaming the first semi-foamed granules 410 (such as the first granules 412 and the second granules 414) and the first semi-foamed granules 410 include microwave treatable material.

Figure 6A:
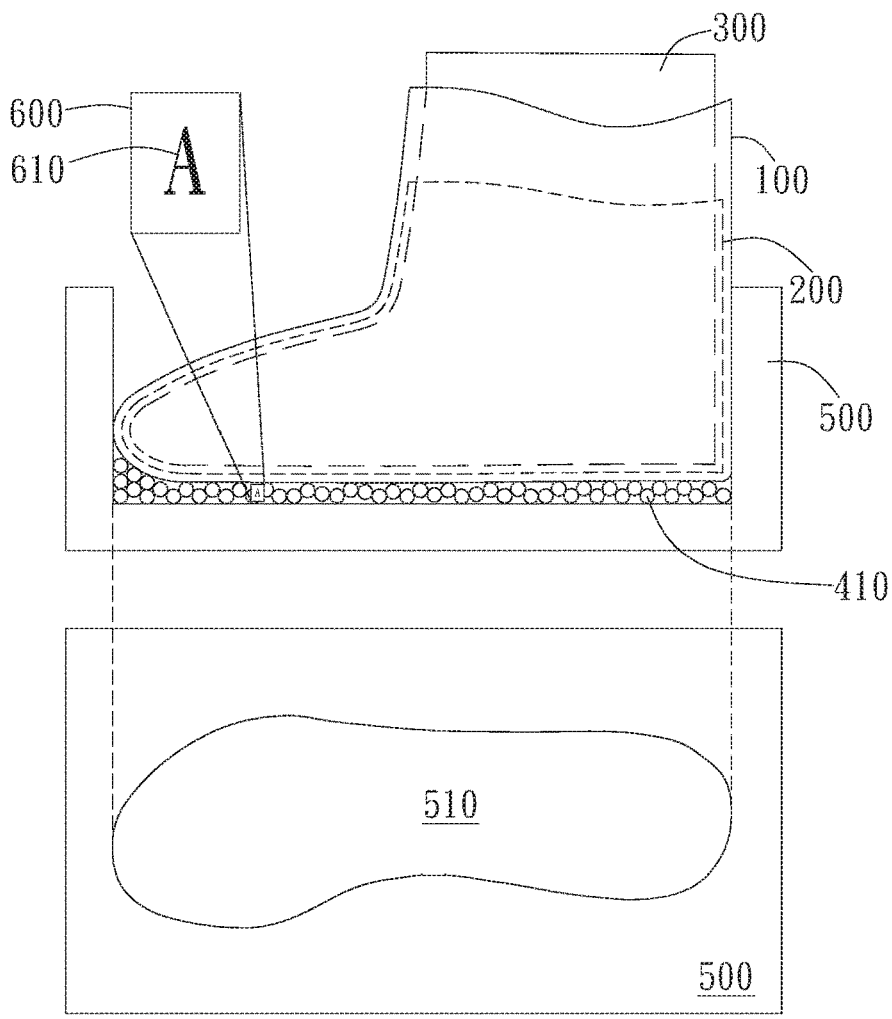
FIGS. 6A and 6B are schematic views of an embodiment of the method of integrating the outsole with an indication pattern to the waterproof and moisture permeable shoe upper and the shoe upper formed by the method of the invention.
Figure 6B:
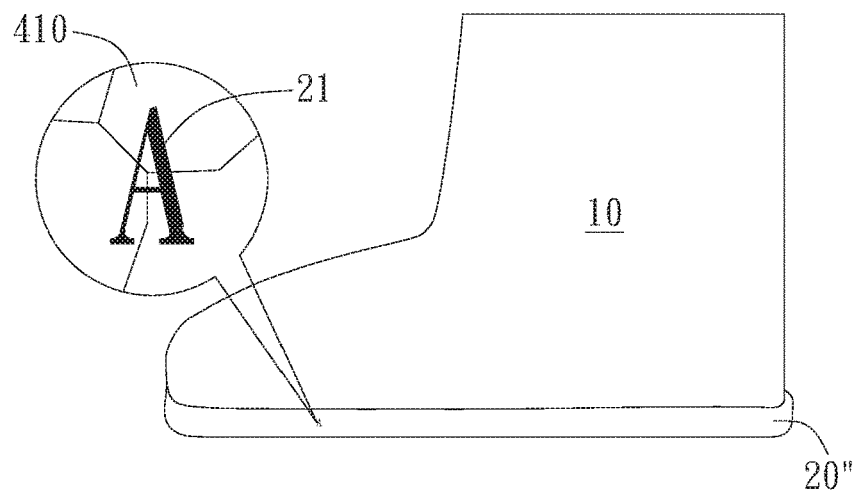

In another embodiment, as shown in FIGS. 6A and 6B, the method further includes: disposing one or more film-like members 600 in the mold 500 to contact the plurality of first semi-foamed granules 410. At least one of the film-like members 600 preferably has a pattern 610, and the outsole 20 or 20' will have an indication pattern 21 corresponding to the pattern 610 after foaming the first semi-foamed granules 410.

Specifically, the film-like member 600 can include microwave treatable material, such as PU, TPU, or TPE, which can be bonded to the first semi-foamed granules 410 after the microwave treatment. In other words, in the microwave heating step, the surface of the film-like member 600 is only slightly melted, and further formed an adhesion force with the semi-foamed material (for example, the first semi-foamed granules 410) after foamed and welded by the microwave. In this case, since the film-like member 600 is not foamed, the deformation of the film-like member 600 is neglectable and the original position of the pattern 610 is substantially not changed or affected. Thereby, after the heating step, the film-like member 600 and the first semi-foamed granules 410 together form the integral outsole 20", and the pattern 610 on the film-like member 600 is presented on the outsole 20" as a "printing" pattern on the outer appearance of the outsole 20". In other words, after the heating step, the indication pattern 21 corresponding to the pattern 610 can be formed on the outsole 20". The indication pattern 21 can be, for example, a decorative pattern or an illustrative marking.

In another embodiment, the film-like member 600 can be made from other materials, such as plastic wrap. After the microwave heating step, the surface of the film-like member 600 is not melted, and the surfaces of the semi-foamed material (such as the first semi-foamed granules 410) can be pressed against and welded to each other due to foaming to position or cover the film-like member 600. As such, the pattern 610 can be transferred to the outsole 20" as the indication pattern 21.

Figure 7A:
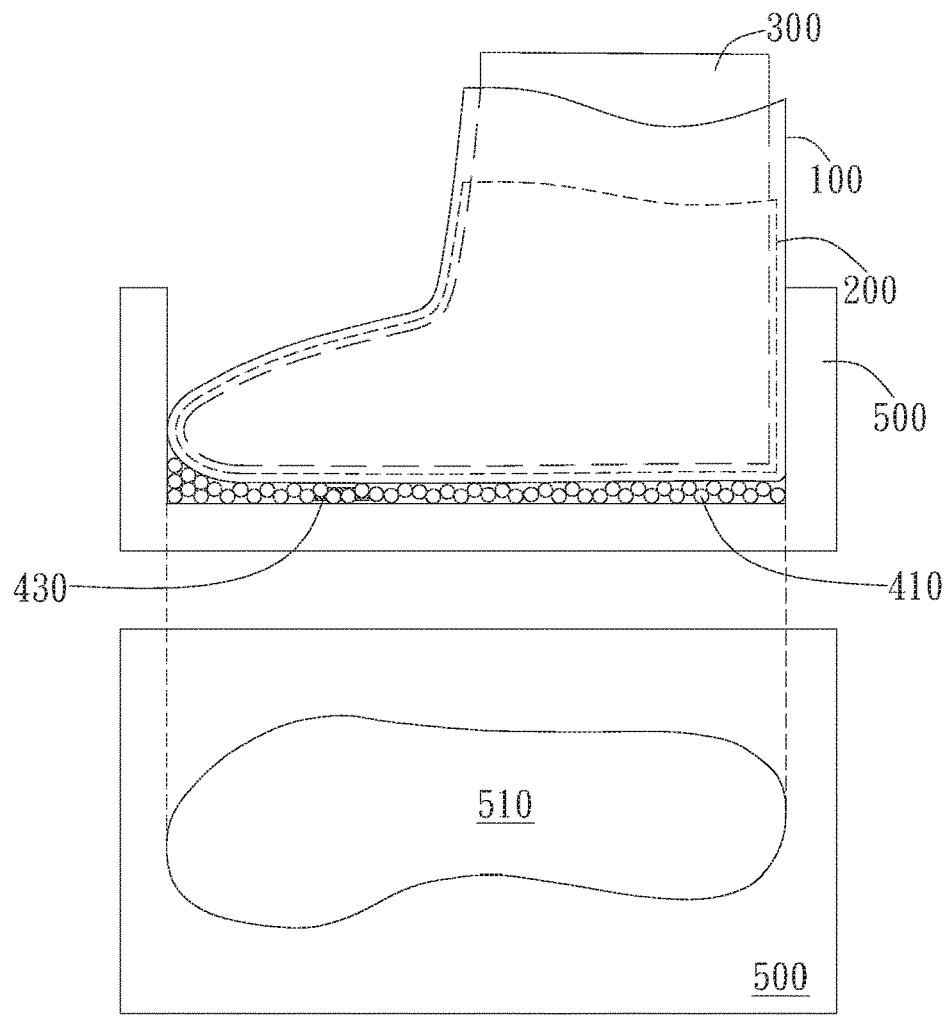
FIGS. 7A and 7B are schematic views of an embodiment of the method of integrating the outsole with an embedded element to the waterproof and moisture permeable shoe upper and the shoe upper formed by the method of the invention.
Figure 7B:
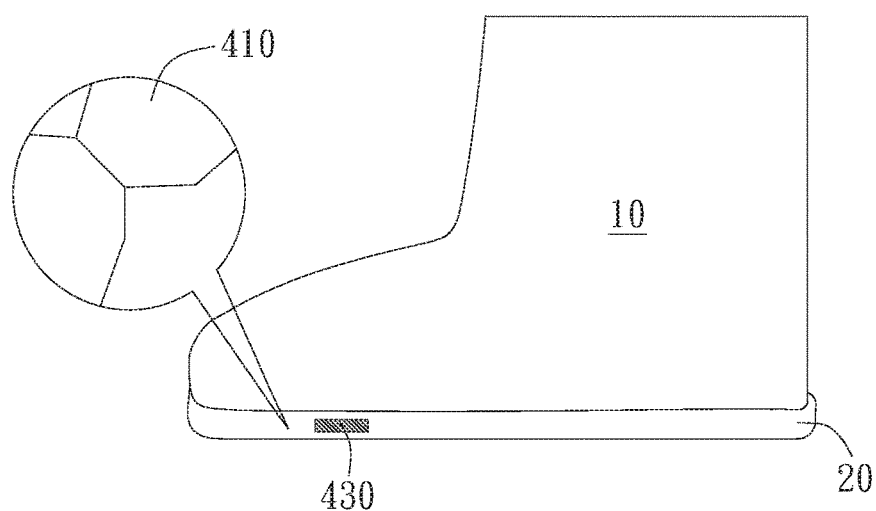

As shown in FIGS. 7A and 7B, in another embodiment, the method further includes: disposing an auxiliary element 430 in the mold 500. During the heating step, the plurality of first semi-foamed granules 410 are foamed and pressed against each other to hold the auxiliary element 430, so that the auxiliary element 430 is embedded in the outsole 20. Specifically, the auxiliary element 430 may be directly placed in the mold 500 to be arranged in common with the first semi-foamed granules 410. For example, the first semi-foamed granules 410 are disposed in the mold 500 to some extent, then the auxiliary element 430 is disposed at a predetermined position, and the first semi-foamed granules 410 are again disposed in the mold 500 to cover the auxiliary element 430. As a result, the auxiliary element 430 is surrounded by the first semi-foamed granules 410. In an embodiment, the auxiliary element 430 is made of a material that is not affected by microwaves. For example, the auxiliary element 430 is made of a material that cannot be heated with the manner of microwaves, and thus the auxiliary element 430 retains its original properties and profile after microwave heating. For example, the auxiliary element 430 may include a chip, a metal piece, or a material that is not polarized and cannot be heated by microwaves or any object that made from other materials that are not affected by microwaves, and can function as a decorative or functional component in the outsole 20. In an embodiment, the auxiliary element 430 can be a GPS tracking chip, so that it is possible to track the real-time whereabouts of wearer. Therefore, the waterproof and moisture permeable shoe upper 10, 10" or 10' of FIG. 1C, 2B or 3B further includes the auxiliary element 430 embedded in the outsole 20.

Figure 8A:
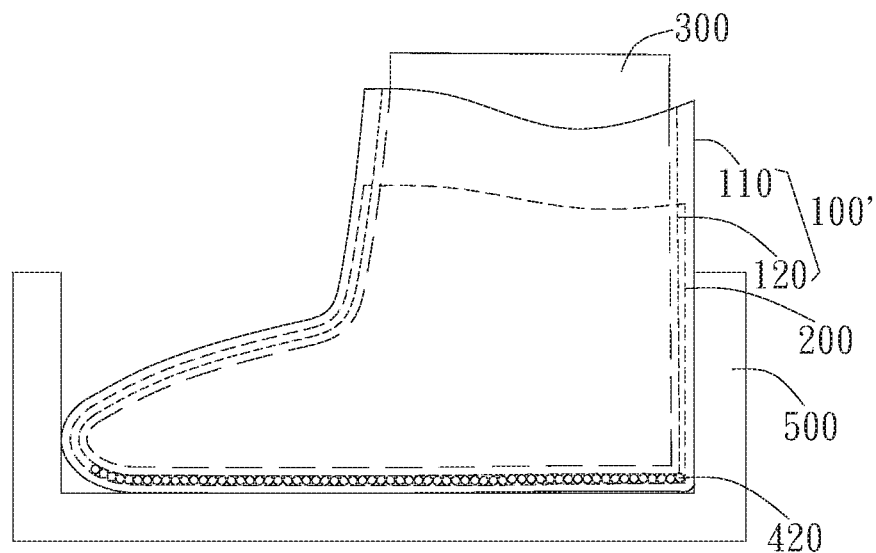
FIGS. 8A and 8B are schematic views of an embodiment of the method of integrating the insole to the waterproof and moisture permeable shoe upper and the shoe upper formed by the method of the invention.
Figure 8B:
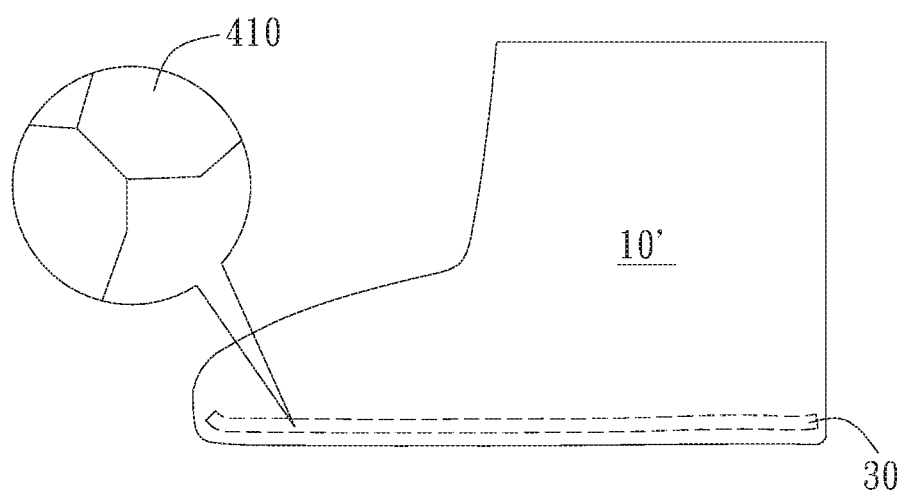

In another embodiment, as shown in FIGS. 8A and 8B, when the shoe upper 100' is a dual-layered knitted structure including the inner layer 120 and the outer layer 110, the method further includes: disposing a plurality of second semi-foamed granules 420 including microwave treatable material between the inner layer 120 and the outer layer 110. During the heating step, the second semi-foamed granules 420 are foamed to form an insole 30 bonded to the waterproof and moisture permeable shoe upper 10'. Specifically, in an embodiment, the microwave treatable material of the second semi-foamed granules 420 includes, but not limited to, PU, TPU, TPE, or a combination thereof, and the second semi-foamed granules 420 can be granules having a foaming ability and formed a certain grain size after foaming to some extent. Specifically, the second semi-foamed granules 420 can be made from the materials of PU, TPU, or TPE, which added a foaming agent and mixed after molded and through the incomplete foaming, and still retain foaming ability. The second semi-foamed granules 420 can be prepared by any means to have a certain degree of foaming and a particle form while still retaining the foaming ability.

The second semi-foamed granules 420 are distributed along the bottom of the shoe last 300 and between the inner layer 120 and the outer layer 110 of the shoe upper 100'. According to practical applications, the second semi-foamed granules 420 can be distributed between the inner layer 120 and the waterproof and moisture permeable film 200 or between the waterproof and moisture permeable film 200 and the outer layer 110. The shoe upper 100' having the second semi-foamed granules 420 and the waterproof and moisture permeable film 200 disposed between the inner layer 120 and the outer layer 110 is then set on the shoe last 300. During the microwave heating step, the second semi-foamed granules 420 are foamed with the surfaces thereof welded to each other and bonded to the inner layer 120 (or the outer layer 110) of the waterproof and moisture permeable shoe upper 10 (or 10') along the bottom of the shoe upper 100' (or the shoe last 300). That is, in the microwave heating step, the second semi-foamed granules 420 can be foamed to form an insole 30, which is integrally bonded to the waterproof and moisture permeable shoe upper 10', eliminating the additional disposing step of the insole after the waterproof and moisture permeable shoe upper 10' is formed and shaped. Therefore, the waterproof and moisture permeable shoe upper 10' in FIG. 3B may further include the insole 30, wherein the insole 30 is disposed between the inner layer 120 and the outer layer 110, and the insole 30 is formed by foaming the second semi-foamed granules 420, which include microwave treatable material.

It is noted that the formation of the outsole 20 (or, 20', 20") shown in FIGS. 4A-4B (or 5A-5B, 6A-6B), the disposition of the auxiliary element 430 shown in FIGS. 7A-7B, and the formation of the insole 30 of FIGS. 8A and 8B can be optionally integrated into the heating step of the method of forming the waterproof and moisture permeable shoe upper 10, 10", 10' shown in FIGS. 1A-1C, 2A-2B, or 3A-3B, to form an integral outsole, embedded element, and/or the insole in a simplified manner.

Figure 9A:
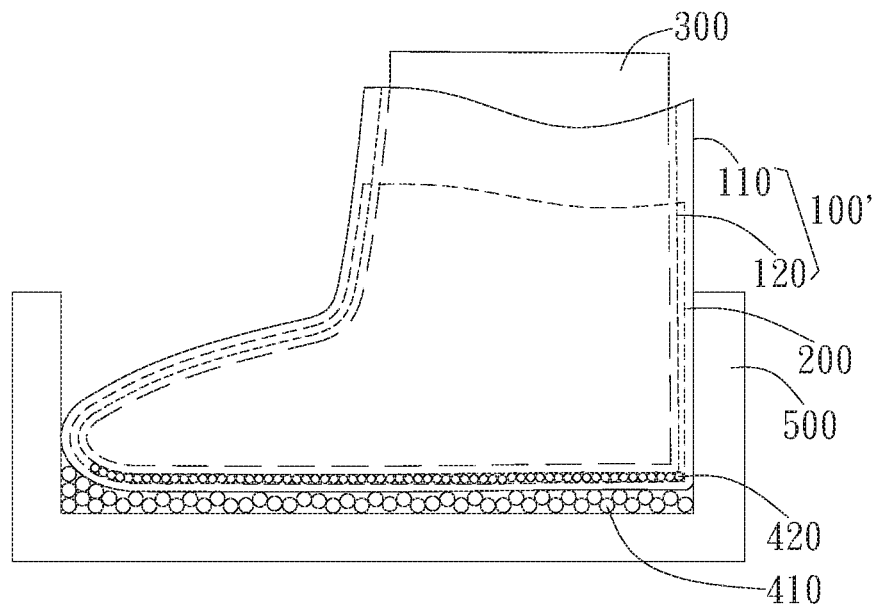
FIGS. 9A and 9B are schematic views of an embodiment of the method of integrating the insole and the outsole to the waterproof and moisture permeable shoe upper and the shoe upper formed by the method of the invention.
Figure 9B:
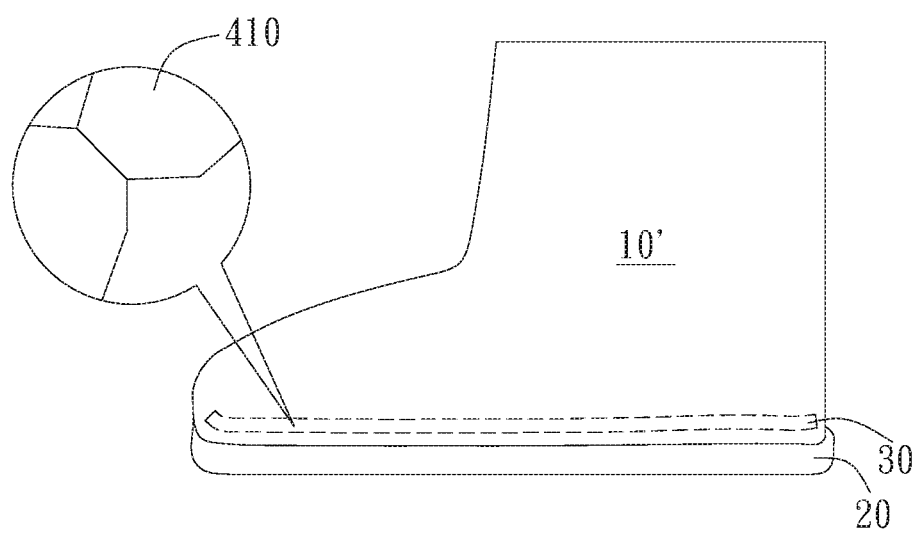

In a variant embodiment of FIGS. 9A and 9B, after the shoe upper 100' having the second semi-foamed granules 420 and the waterproof and moisture permeable film 200 disposed between the inner layer 120 and the outer layer 110 is set on the shoe last 300 (as shown in FIG. 8A), the shoe last 300 can be disposed on the mold 500 of FIG. 4A and at least partially contacts the first semi-foamed granules 410. During the microwave heating step, the shoe upper 100' and the waterproof and moisture permeable film 200 are combined by the microwave treatable material, and the first semi-foamed granules 410 and the second semi-foamed granules 420 are foamed to form the outsole 20 and the insole 30, which are integrated with the waterproof and moisture permeable shoe upper 10'.

Figure 10A:
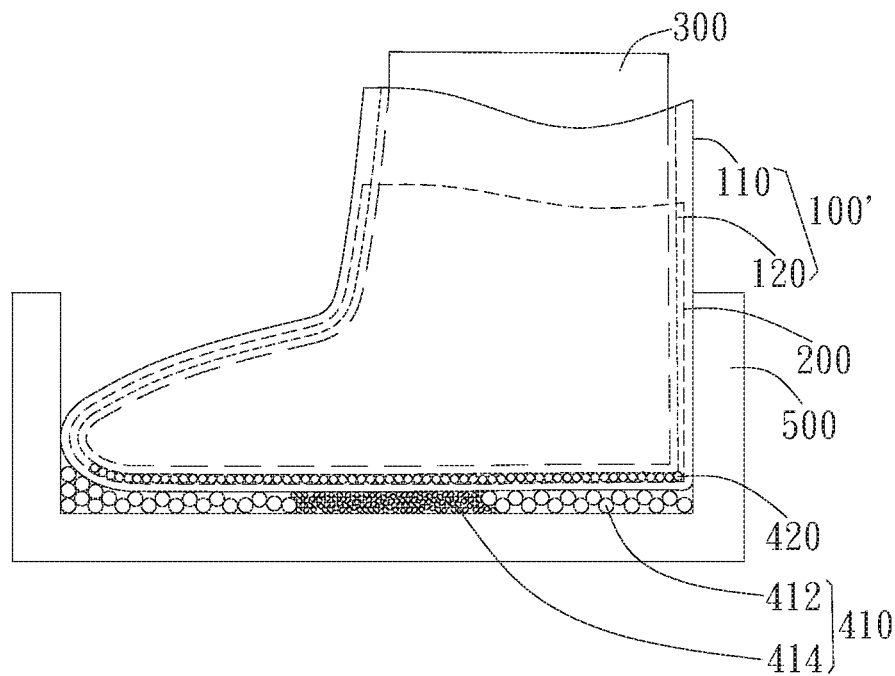
FIGS. 10A and 10B are schematic views of another embodiment of the method of integrating the insole and the outsole to the waterproof and moisture permeable shoe upper and the shoe upper formed by the method of the invention.
Figure 10B:
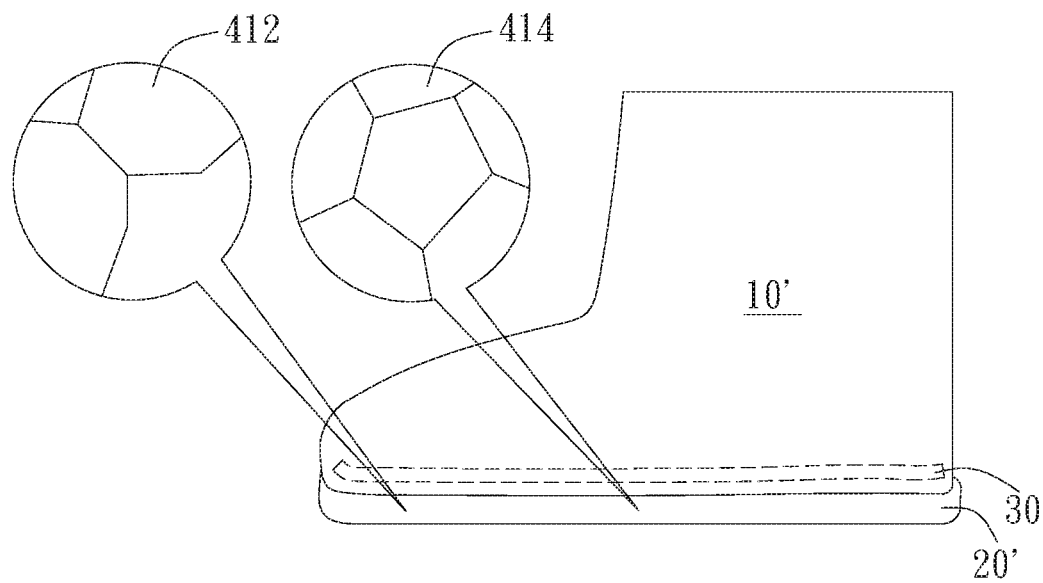

In a variant embodiment of FIGS. 10A and 10B, after the shoe upper 100' having the second semi-foamed granules 420 and the waterproof and moisture permeable film 200 disposed between the inner layer 120 and the outer layer 110 is set on the shoe last 300 (as shown in FIG. 8A), the shoe last 300 can be disposed on the mold 500 of FIG. 5A and at least partially contacts the first semi-foamed granules 410 of different ranges of grain size, such as the first granules 412 and the second granules 414. During the microwave heating step, the shoe upper 100' and the waterproof and moisture permeable film 200 are combined by the microwave treatable material, and the first semi-foamed granules 410 and the second semi-foamed granules 420 are foamed to form the outsole 20' and the insole 30, which are integrated with the waterproof and moisture permeable shoe upper 10'.

Figure 11A:
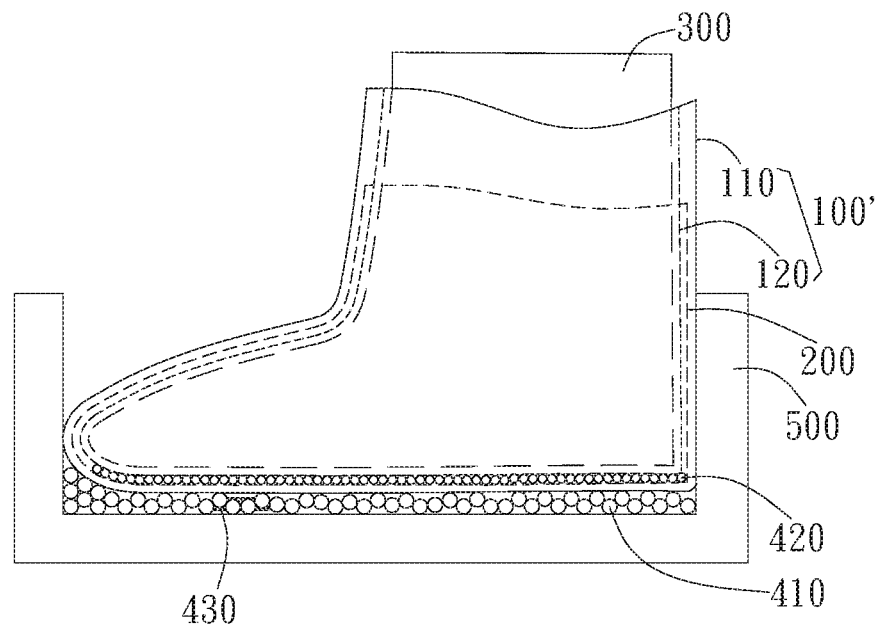
FIGS. 11A and 11B are schematic views of an embodiment of the method of integrating the insole with an embedded element to the waterproof and moisture permeable shoe upper and the shoe upper formed by the method of the invention.
Figure 11B:
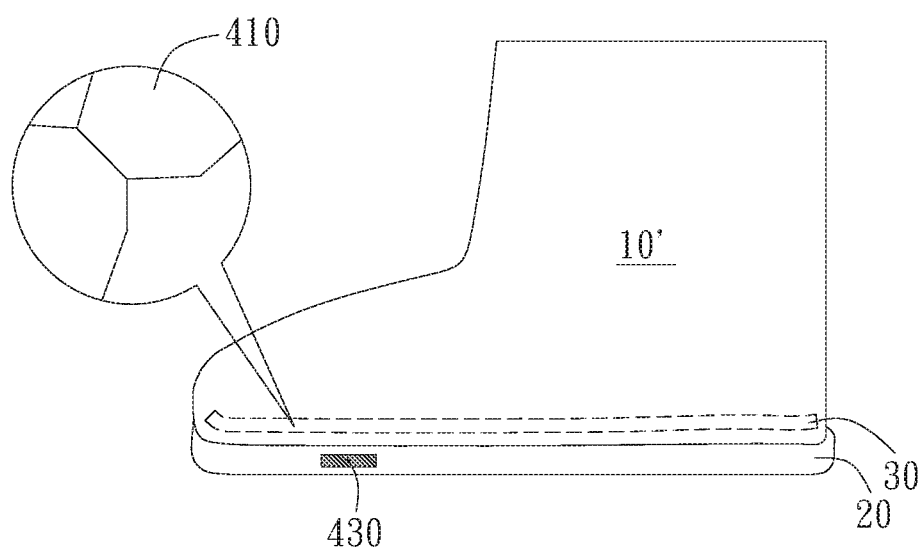

In a variant embodiment of FIGS. 11A and 11B, after the shoe upper 100' having the second semi-foamed granules 420 and the waterproof and moisture permeable film 200 disposed between the inner layer 120 and the outer layer 110 is set on the shoe last 300 (as shown in FIG. 8A), the shoe last 300 is disposed on the mold 500 of FIG. 7A and at least partially contacts the first semi-foamed granules 410 with the auxiliary element 430 therein. During the microwave heating step, the shoe upper 100' and the waterproof and moisture permeable film 200 are combined by the microwave treatable material, and the first semi-foamed granules 410 and the second semi-foamed granules 420 are foamed to form the outsole 20 with the auxiliary element 430 embedded therein and the insole 30, which are integrated with the waterproof and moisture permeable shoe upper 10'.

Figure 12A:
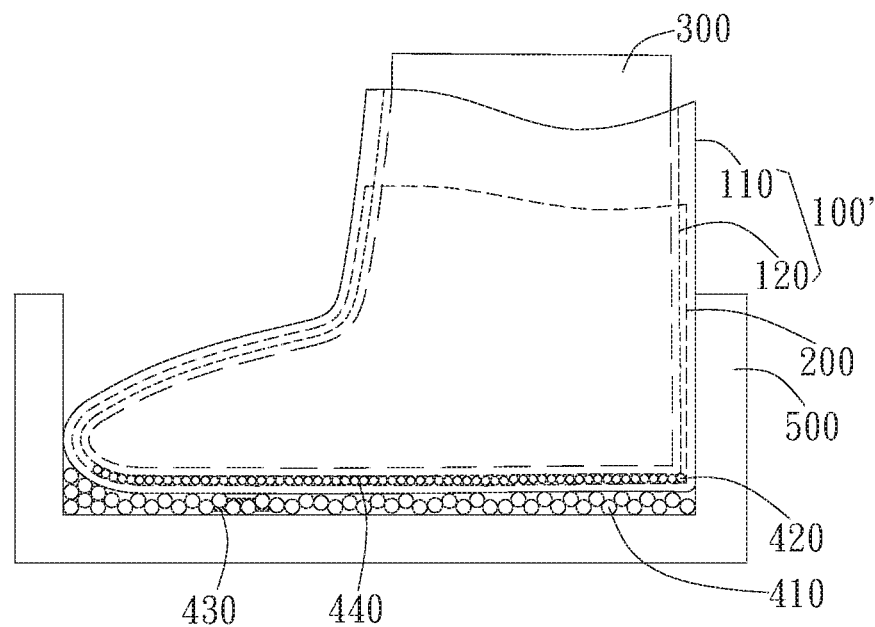
FIGS. 12A and 12B are schematic views of an embodiment of the method of integrating an auxiliary element, the insole, and the outsole to the waterproof and moisture permeable shoe upper and the shoe upper formed by the method of the invention.
Figure 12B:
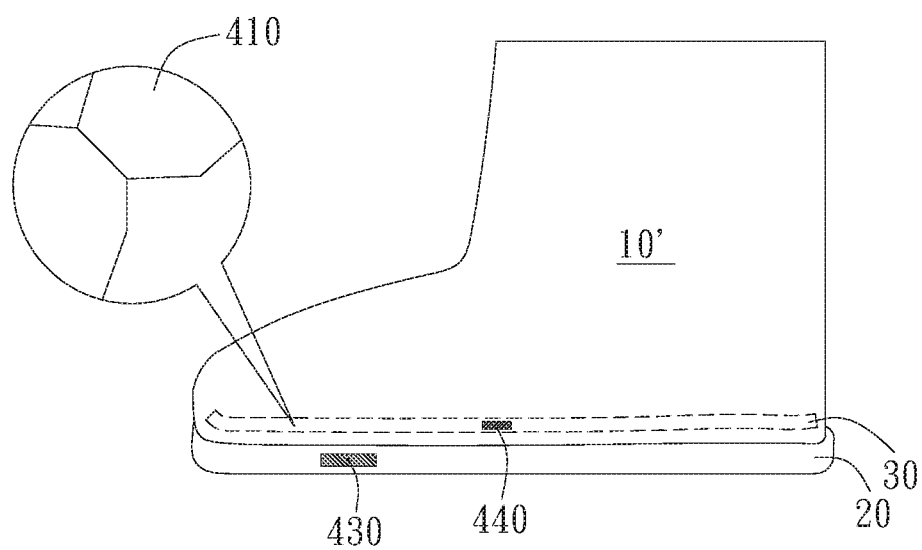

In a variant embodiment of FIGS. 12A and 12B, when disposing the second semi-foamed granules 420 in FIG. 8A, another auxiliary element 440 can be disposed among the second semi-foamed granules 420. After the shoe upper 100' having the second semi-foamed granules 420 with the auxiliary element 440 therein and the waterproof and moisture permeable film 200 disposed between the inner layer 120 and the outer layer 110 is set on the shoe last 300, the shoe last 300 can be disposed on the mold 500 of FIG. 7A and at least partially contacts the first semi-foamed granules 410 with the auxiliary element 430 therein. During the microwave heating step, the shoe upper 100' and the waterproof and moisture permeable film 200 are combined by the microwave treatable material, and the first semi-foamed granules 410 and the second semi-foamed granules 420 are foamed to form the outsole 20 with the auxiliary element 430 embedded therein and the insole 30 with the auxiliary element 440 embedded therein, which are integrated with the waterproof and moisture permeable shoe upper 10'.

It is noted that the microwave treatable materials of the at least one of the shoe upper 100/100' and the waterproof and moisture permeable film 200, the first semi-foamed granules 410, the second semi-foamed granules 420, and the film-like member 600 can be same or different material, and independently selected from the group consisting of polyurethane, thermoplastic polyurethane, thermoplastic elastomer, and a combination thereof, but not limited thereto. Moreover, the semi-foamed granules of different ranges of grain size are illustrated with the first granules 412 and the second granules 414 in two different ranges of grain size as an example, but not limited thereto. According to practical applications, the semi-foamed granules may have two or more different ranges of grain size to form the outsole or the insole.

Compared to the prior art, the invention utilizes the microwave heating to heat up the heating object from the inside to the whole in a short time, which is faster and more uniform, so that the homogeneity of the finally produced product can be improved, and the microstructures are not easily destroyed and can retain better microstructures and corresponding functions.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A method of forming and shaping a waterproof and moisture permeable shoe upper, comprising:
   disposing a shoe upper and a waterproof and moisture permeable film on a shoe last, wherein at least one of the shoe upper and the waterproof and moisture permeable film comprises microwave treatable material; and
   heating the shoe last with the shoe upper and the waterproof and moisture permeable film thereon by microwave, so that the shoe upper and the waterproof and moisture permeable film are combined by the microwave treatable material and shaped to form the waterproof and moisture permeable shoe upper after cooling,
   wherein the shoe upper is a dual-layered knitted structure comprising an inner layer and an outer layer, and the method further comprises:
   disposing a plurality of second semi-foamed granules comprising microwave treatable material between the inner layer and the outer layer before the heating step,
   wherein during the heating step, the second semi-foamed granules are foamed to form an insole bonded to the waterproof and moisture permeable shoe upper.

2. The method of claim 1, wherein the waterproof and moisture permeable film is disposed between the shoe last and the shoe upper.

3. The method of claim 1, wherein the waterproof and moisture permeable film is disposed between the inner layer and the outer layer.

4. The method of claim 1, before the heating step, further comprising:
   disposing a plurality of first semi-foamed granules comprising microwave treatable material into a mold; and
   disposing the shoe last with the shoe upper and the waterproof and moisture permeable film thereon on the mold in a manner that the shoe upper at least partially contacts the first semi-foamed granules,
   wherein during the heating step, the first semi-foamed granules are foamed to form an outsole bonded to the waterproof and moisture permeable shoe upper.

5. The method of claim 4, further comprising:
   disposing an auxiliary element in the mold, wherein during the heating step, the plurality of first semi-foamed granules are foamed and pressed against each other to hold the auxiliary element, so that the auxiliary element is embedded in the outsole.

6. The method of claim 4, wherein the plurality of first semi-foamed granules comprises a plurality of first granules within a first range of grain size and a plurality of second granules within a second range of grain size; a median of the first range of grain size is substantially larger than a median of the second range of grain size, and the step of disposing the plurality of first semi-foamed granules comprises disposing the plurality of first granules and the plurality of second granules in different regions of the mold.

7. The method of claim 4, wherein the step of disposing the plurality of first semi-foamed granules further comprises:
   disposing one or more film-like members in the mold to contact the plurality of first semi-foamed granules.

8. The method of claim 7, wherein at least one of the film-like members has a pattern, and the outsole has an indication pattern corresponding to the pattern.

9. The method of claim 4, wherein the microwave treatable materials of the at least one of the shoe upper and the waterproof and moisture permeable film, the first semi-foamed granules, and the second semi-foamed granules are same or different material, and independently selected from the group consisting of polyurethane, thermoplastic polyurethane, thermoplastic elastomer, and a combination thereof.

10. A waterproof and moisture permeable shoe upper made by the method of claim 1, characterized in that:
    the waterproof and moisture permeable film has a waterproof ability of 1000 mm to 2000 mm or more and a moisture permeability of 2000 to 3000 $g/m^2/24$ h or more.

11. A method of forming and shaping a waterproof and moisture permeable shoe upper, comprising:
    disposing a shoe upper and a waterproof and moisture permeable film on a shoe last, wherein at least one of the shoe upper and the waterproof and moisture permeable film comprises microwave treatable material;
    disposing a plurality of first semi-foamed granules comprising microwave treatable material into a mold;
    disposing the shoe last with the shoe upper and the waterproof and moisture permeable film thereon on the mold in a manner that the shoe upper at least partially contacts the first semi-foamed granules, and
    heating the shoe last with the shoe upper and the waterproof and moisture permeable film thereon by microwave, so that the shoe upper and the waterproof and moisture permeable film are combined by the microwave treatable material and shaped to form the waterproof and moisture permeable shoe upper after cooling,
    wherein during the heating step, the first semi-foamed granules are foamed to form an outsole bonded to the waterproof and moisture permeable shoe upper.

* * * * *